United States Patent
Tabanelli et al.

(10) Patent No.: US 10,046,509 B2
(45) Date of Patent: Aug. 14, 2018

(54) METHOD AND APPARATUS FOR CHAMFERING AN END OF A PIPE MADE FROM THERMOPLASTIC MATERIAL

(71) Applicant: SICA S.P.A., Alfonsine (Ravenna) (IT)

(72) Inventors: Giorgio Tabanelli, Cotignola (IT); Marco Gulminelli, Lavezzola (IT)

(73) Assignee: SICA S.P.A., Alfonsine (IT)

( * ) Notice: Subject to any disclaimer, the term of this patent is extended or adjusted under 35 U.S.C. 154(b) by 0 days.

(21) Appl. No.: 15/292,953

(22) Filed: Oct. 13, 2016

(65) Prior Publication Data

US 2017/0028612 A1 Feb. 2, 2017

Related U.S. Application Data

(62) Division of application No. 14/384,838, filed as application No. PCT/IB2012/053845 on Jul. 27, 2012, now Pat. No. 9,757,894.

(30) Foreign Application Priority Data

Mar. 23, 2012 (IT) .............................. RN2012A0018

(51) Int. Cl.
| | | |
|---|---|---|
| B29C 37/02 | (2006.01) | |
| B29C 57/02 | (2006.01) | |
| B29C 57/00 | (2006.01) | |
| B29C 35/08 | (2006.01) | |
| B29K 101/12 | (2006.01) | |
| B29K 105/00 | (2006.01) | |
| B29L 23/00 | (2006.01) | |
| B29K 701/12 | (2006.01) | |

(52) U.S. Cl.
CPC .......... *B29C 57/02* (2013.01); *B29C 35/0805* (2013.01); *B29C 57/00* (2013.01); *B29C 2035/0822* (2013.01); *B29K 2101/12* (2013.01); *B29K 2105/258* (2013.01); *B29K 2701/12* (2013.01); *B29L 2023/22* (2013.01)

(58) Field of Classification Search
CPC ................ B29C 57/00; B29C 35/0805; B29C 2035/0822; B29K 2101/12; B29K 2105/258; B29L 2023/22
See application file for complete search history.

(56) References Cited

U.S. PATENT DOCUMENTS

| | | |
|---|---|---|
| 3,929,943 A | 12/1975 | Klimaszewski, Jr. |
| 3,986,810 A | 10/1976 | La Branche et al. |
| 4,390,383 A | 6/1983 | Van Dongeren |
| 5,200,124 A | 4/1993 | Bowkett |
| 5,716,572 A | 2/1998 | Lesiczka et al. |
| 8,147,236 B1 | 4/2012 | Rowley et al. |

FOREIGN PATENT DOCUMENTS

| | | |
|---|---|---|
| EP | 0 129 515 A2 | 12/1984 |
| JP | 57 105308 A | 6/1982 |
| JP | H08 108479 A | 4/1996 |
| WO | 2012051481 A1 | 4/2012 |

*Primary Examiner* — Galen H Hauth
(74) *Attorney, Agent, or Firm* — Pearne & Gordon LLP

(57) ABSTRACT

Described is a method for chamfering the end of a pipe (2) made from thermoplastic material, comprising the following steps: localized and circumferential heating of an axial portion (3) of the pipe (2) at a predetermined temperature; plastic deformation of the heated axial portion (3) using a tool (4) for forming a chamfer on the axial portion (3).

13 Claims, 9 Drawing Sheets

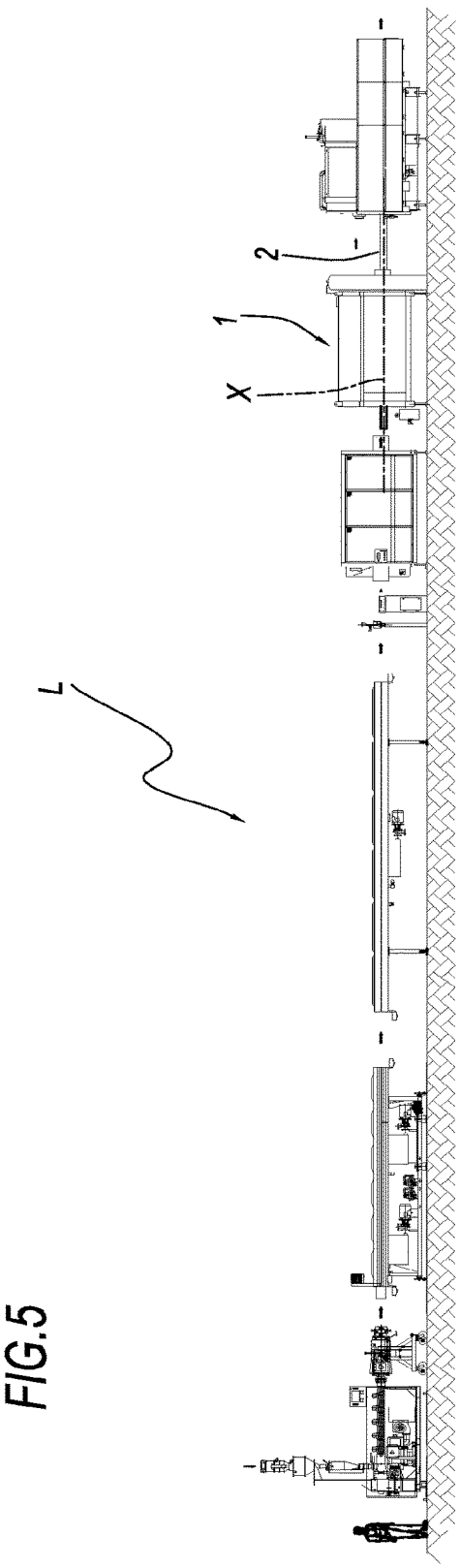

METHOD AND APPARATUS FOR CHAMFERING AN END OF A PIPE MADE FROM THERMOPLASTIC MATERIAL

TECHNICAL FIELD

This invention relates to a method and an apparatus for processing a pipe made from thermoplastic material, more specifically a method and an apparatus for chamfering an end of the pipe.

BACKGROUND ART

Pipes made from thermoplastic material are used, for example, as rigid pipes for sanitary purposes, for outdoor rainwater pipes, for water distribution and drains.

Pipes made from thermoplastic material are produced by an extrusion process, in a plant which draws the material in the plastic state, using a screw that rotates inside a cylinder, through a mould of suitable shape and dimensions.

The pipe production plant is known as extrusion line and it comprises a plurality of apparatuses, each designed for a specific function.

An apparatus, generally located at the end of the line, known as "cutter" is usually present in this system.

This apparatus is designed for cutting the pipe into pieces of pipe of precise and predetermined length.

This apparatus comprises a cutting unit installed on a movable carriage synchronized with the pipe and equipped with clamping means, designed for coupling with the pipe during the cutting operation.

With reference to the motion of the processing tool relative to the axis of the pipe, there are two different types of cutter apparatus: the shearing cutter apparatus and the planetary cutter apparatus.

The shearing cutter machines are characterised by a working motion of the cutting tool with direction of movement perpendicular to the axis of the pipe, whilst the planetary cutters are characterised by a working motion of the cutting tool with a circular movement relative to the axis of the pipe.

With reference to the cut, there are cutting techniques without removal of material and cutting techniques with removal of material.

The cutting techniques without removal of material can only be used for materials which are tough and with limited hardness, that is, materials characterised by high resistance to dynamic stresses and poor resistance to penetration of cutting tools.

Examples of tough materials with limited hardness are the thermoplastics PE, PP and PB.

More specifically, these materials can be cut with cutting tools designed as blades with one or more cutting edges or with circular disk blades rotating freely about a respective axis or with guillotine blades.

More specifically, it should be noted that these cutting techniques can be used with pipes having relatively small wall thicknesses; on the other hand, with pipes having particularly large wall thicknesses, these cutting techniques are difficult to carry out because the cutting tool (generally in the shape of a circular disk) is subject to high levels of stress which favour deformation.

For materials with a particularly high hardness and a fragile-type mechanical behaviour the above-mentioned cutting techniques without removal of material are not practicable because these techniques would cause failure of the pipe during cutting (with possible damaging of the tool) and, in any case, the cut would be imprecise; in that case, the pipe is cut using cutting techniques with removal of material.

The cutting apparatus for these techniques comprises metal circular saws which are multi-serrated or have a surface coating of abrasive material.

It should be noted that the cutting by removing material generates large quantities of chippings which must be immediately removed from the cutting area to avoid malfunctioning of the cutting machine and/or other apparatuses nearby.

Moreover, these cuttings are harmful for the user and can electrostatically charge and adhere to the walls of the pipe making the subsequent processing of the pipe impracticable.

With particular types of materials which are particularly rich in mineral filler added to the base polymer, for example pipes made of amorphous material such as PVC-U, ABS and PMMA, there is the generation of dust which if not adequately removed from the cutting area can damage mechanical components of the apparatus and be harmful for the operators.

It should also be noted that cutting techniques with removal of material generate harmful vibrations which are transmitted to the machine components.

Other processing which may be performed on the pipe, in the extrusion line or also off line, is the chamfering of ends.

This processing is performed on the end of a piece of pipe and consists in making—by removing material—a chamfer on the end of a piece of pipe for allowing a sealed coupling with a cup or bell, that is, with the wide end of another piece of pipe.

It should be noted that this operation can be performed simultaneously with or after the cutting process.

In light of the above, there has been a long felt need for providing a method and an apparatus capable of processing a pipe (specifically, for chamfering) without removal of material (that is, without the generation of chippings and/or dust).

Even more specifically, the need is particularly felt for a method and an apparatus capable of chamfering the ends of pipes with particularly large wall thicknesses and/or pipes of particular high hardness and fragile mechanical behaviour.

DISCLOSURE OF THE INVENTION

The aim of this invention is therefore to meet the above mentioned needs by providing a method and an apparatus for chamfering a pipe.

Another aim of the invention is to allow the chamfering of the ends of pipes made from thermoplastic material of any type, thickness and dimension obtaining a high quality of finished product.

BRIEF DESCRIPTION OF THE DRAWINGS

The technical characteristics of the invention, with reference to the above aims, are clearly described in the claims below and its advantages are apparent from the detailed description which follows, with reference to the accompanying drawings which illustrate a preferred embodiment of the invention provided merely by way of example without restricting the scope of the inventive concept, and in which

FIG. 5 is a side view of an extrusion line of the pipe in which the apparatus according to this invention is installed;

DESCRIPTION OF THE PREFERRED EMBODIMENTS OF THE INVENTION

Figure 1:
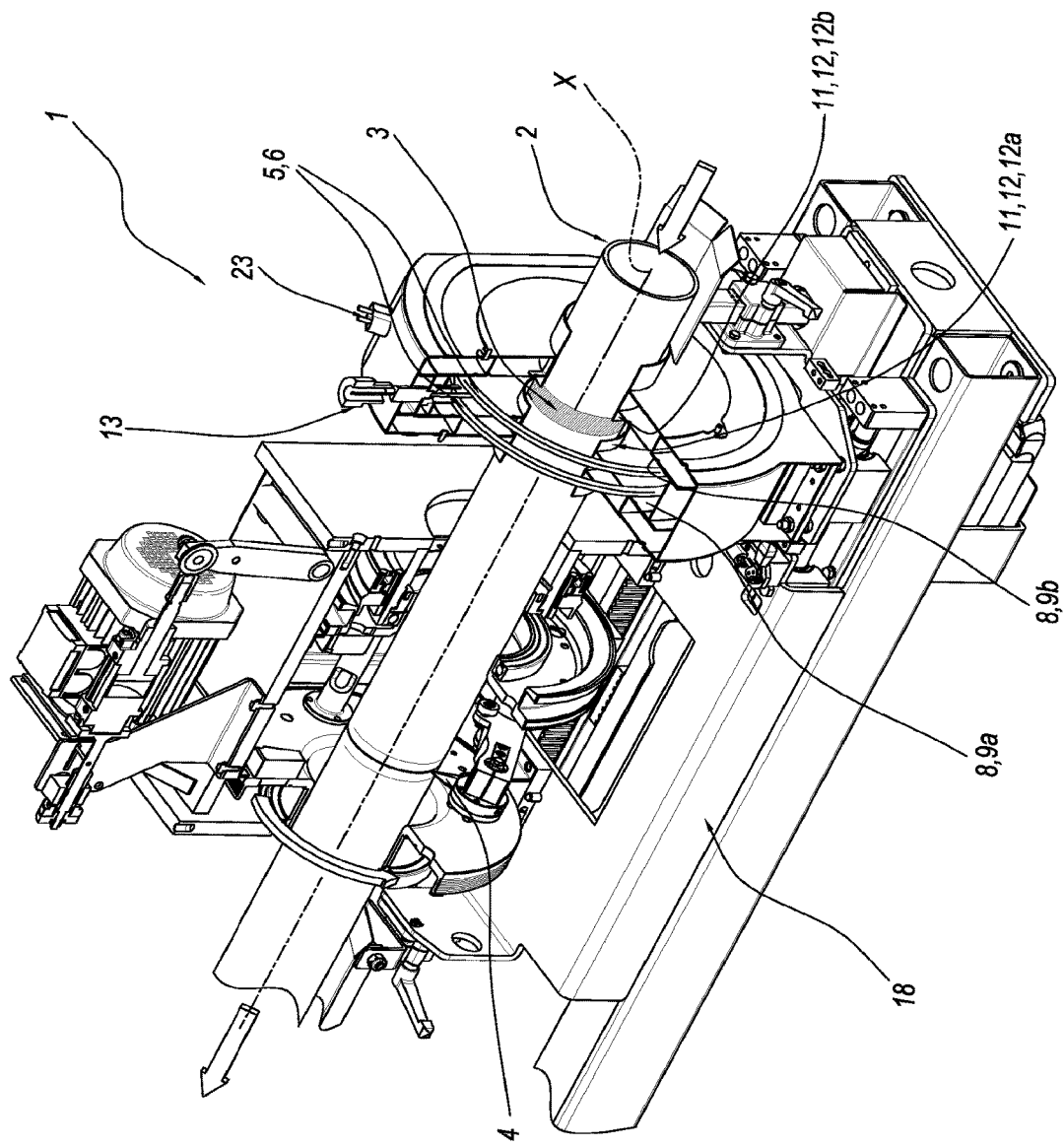
FIG. 1 is a perspective view of a first embodiment of the apparatus according to this invention.

With reference to the accompanying drawings, the numeral 1 denotes an apparatus for processing pipes made from thermoplastic material according to this invention. The expression "pipes made from thermoplastic material" is used to mean any pipe made from thermoplastic material, for example pipes made from PVC-U, PMMA, ABS (amorphous thermoplastics), PE, PP and PB (semi-crystalline thermoplastics) etc.

The method for processing a pipe 2 made from thermoplastic material according to this invention comprises the following steps:
 a) localised and circumferential heating of a localised axial portion 3 of the pipe 2 at a predetermined operating temperature;
 b) processing, using a tool 4, of the heated axial portion 3.

It should be noted that the localised axial portion 3 is shown, in the attached drawings, with sloping lines.

With regards to heating step a), a portion 3 of the pipe 2 is heated circumferentially, that is, over the entire circumference of the pipe 2.

This heating is substantially a localised heating because it does not involve the entire pipe but a portion of it.

More specifically, it should be noted that the expression "localised axial portion" means a portion having a limited axial extension (preferably less than the diameter of the pipe).

More specifically, only the portion 3 on which a processing, using the tool 4, is subsequently carried out, is heated.

It should be noted that the heated axial portion 3 has an axial extension as a function of a thickness (of wall) and/or of a diameter of the pipe 2.

More specifically, according to this aspect, the axial extension of the axial portion 3 is proportional to the thickness of wall and/or diameter of the pipe 2.

It should, however, be noted that an axial extension of the cutting portion 3 which is too long can determine, in the subsequent operations (particularly during cutting), unacceptable permanent deformations of the pipe 2.

With reference to the predetermined operating temperature (that is, the heating temperature), attention is drawn to the following.

For the amorphous structure materials (PVC-U, PMMA, ABS) the predetermined heating temperature depends on the so-called vitreous transition temperature of the material; more specifically, during step a) the heating is carried out at a temperature higher than the vitreous transition temperature of the material of the pipe 2 being processed.

It is known that the thermoplastic materials (PVC-U, PMMA, ABS) are characterised by a temperature, or more generally a range of temperatures, the so-called vitreous transition temperature (Tg) at which the material has a complex visco-plastic mechanical behaviour, that is, it tends to "soften".

By way of example, the typical vitreous transition temperatures of some thermoplastic materials with an amorphous structure are shown below:

PVC-U Tg=75° C.-80° C.;
PMMA Tg=105° C.-120° C.;
ABS Tg=95° C.-105° C.

With reference to pipes made from semi crystalline thermoplastic material, the predetermined heating temperature is less (generally close to) the melting temperature of the material of the pipe 2: the vitreous transition temperatures for these materials are close to or even less than 0° and, at ambient temperature, these materials are already at a temperature higher than vitreous transition temperature.

By way of example, the melting temperature of PP is 165° and a possible predetermined heating temperature for this material could be 140° C.

The heating process, localized in the cutting zone, must occur without damaging, melting or burning the material.

Preferably, the heating step comprises a step of emitting electromagnetic waves in the direction of the axial portion 3 of the pipe 2.

Preferably, the electromagnetic waves are emitted circumferentially, that is, along the entire circumference of the pipe.

It should be noted that the expression "emitted circumferentially" means that the waves are emitted in an annular direction, for intercepting the outer surface of the portion 3 of the pipe and from this propagate towards the inner layers of the portion 3 of the pipe.

Therefore, preferably, the portion 3 of the pipe is heated by electromagnetic waves incident on the outer surface of the portion 3 of the pipe.

It should be noted that the electromagnetic waves propagate through the walls of the pipe 2, for heating in an extremely short time the entire portion 3 of the pipe 2.

Preferably, the electromagnetic waves are emitted along the entire circumference of the pipe in an equally spaced manner.

The electromagnetic waves are emitted mainly in the 0.8-4 micron range. It should be noted that, preferably, the heating step comprises a step of reflecting the electromagnetic waves emitted in the direction of the axial portion 3 of the pipe 2.

In other words, a part of the electromagnetic waves emitted by the source is directed towards the portion 3 of the pipe 2 whilst another part is re-directed, by one or more reflections, towards the portion 3 of the pipe 2.

This reflection is achieved by reflection means 8, which are described in more detail below.

According to another aspect, the heating step preferably comprises measuring the temperature of the portion 3 of pipe 2, for controlling the heating as a function of the temperature measured.

In other words, according to this aspect, the temperature of the portion 3 of pipe 2 is measured in such a way as to change it to the predetermined (or operating) temperature.

It should be noted that, preferably, the temperature measuring is carried out by a sensor 13; yet more preferably, the measuring is carried out by a sensor 13 of a non-contact type (preferably an optical pyrometer).

With reference to the above-mentioned step b) for processing the heated portion 3 of the pipe 2, it should be noted that this type of processing may consist of cutting (operation b1) or chamfering of the end of the pipe 2 (operation b2).

It should be noted that the following description also describes a method and a relative apparatus for carrying out individually the cutting operation b1: this method and apparatus fall within the scope of protection afforded by this invention solely in combination with the method and the relative chamfering apparatus designed for operation b2.

With reference to the cutting operation b1, according to this method, after heating the portion 3 of pipe 2 at the predetermined temperature, the cutting is carried out using a tool 4 at the heated portion 3.

It should be noted that for the cutting operation the heated portion 3 has, preferably, an axial extension less than the diameter of the pipe 2 (yet more preferably less than the radius) whilst for the operation for chamfering the end of the pipe the heated portion 3 has, preferably, an axial extension less than the diameter of the pipe 2 (yet more preferably less than the radius) and more than the axial extension of the chamfer (preferably at least twice the axial extension of the chamfer).

It should be noted that the cutting tool 4 is, preferably, knife tool.

Alternatively, the type of tool 4 is a guillotine tool.

It should be noted that the tool 4 has a blade.

Wither reference to the working motion of the knife tool, the apparatus 1 is configured in such a way that the tool 4 is movable with a direction of movement perpendicular (radially) to the axis of the pipe 2 and simultaneously in such a way that the tool 4 has a circular movement relative to the axis of the pipe 2.

In other words, the cutting tool 4 has a combined movement of sinking in a radial direction (inside the thickness of the pipe) and rotation about the axis X of the pipe 2.

The cutting tool 4 subject to this type of combined movement describes, in space, a substantially spiral motion about the axis of the pipe 2.

Therefore, more generally, the tool 4 is a cutting tool, configured for cutting the pipe 2 (that is, separating the material without removal of chippings) at the heated portion 3.

It should be noted that, according to this invention, the fact of cutting at a portion 3 of pipe 2 heated beforehand (at a temperature higher than the vitreous transition temperature) allows the pipe 2 to be cut in a particularly clean and precise manner, without generating imperfections in the cut (deformations, large surface irregularities and defects, etc) and without removing material.

An advantage of this cutting process is that of avoiding the generation of waste or dust, because the cut is made by separation of the material without removal of material.

This process for processing the pipe overcomes all the above-mentioned disadvantages related to the generation of waste or dust, because the cut is made without removal of material.

This process is, advantageously, applicable to thermoplastic materials with an amorphous structure as well as to semi-crystalline thermoplastic materials.

The advantages of a pipe cutting process according to the teachings of this invention are as follows:
- excellent quality of the surface of the pipe in which the cut is made (because of the absence of evident surface imperfections);
- low output required from the actuators provided for the cutting motion,
- reduction in the rate of wear of the tool.

FIGS. 4A-4F illustrate an operating sequence relative to the chamfering (operation b2) on the portion 3 of pipe 2.

It should be noted that, if the processing step consists in a chamfering operation (operation b2) on the portion 3 of pipe 2, the tool 4—according to a first embodiment—comprises a punch 14 and an outer female ring 15, acting in conjunction for chamfering an end of the portion 3 of pipe which has been heated beforehand (step a).

The punch 14 is calibrated on the internal diameter of the pipe and it is configured to be inserted inside the pipe.

On the other hand, the external female ring 14 is shaped for deforming the end of the pipe 2 towards the axis X of the pipe (radially).

It should be noted in this regard that the external female ring 14 comprises a conical end portion 19, configured for flattening (radially) the end of the pipe 2 as described in more detail below.

According to this embodiment, the apparatus 1 preferably also comprises a front flange 16, configured for defining an axial stop during the operation for chamfering the end of the pipe 2.

The operation for chamfering an end of the pipe 2 consists in the reduction of the thickness of the pipe 2 at that end, for making a chamfer at the end of the pipe 2.

Below is a description of a preferred, non-limiting example of the chamfering operation (operation b2) of the apparatus 1.

Figure 4A:
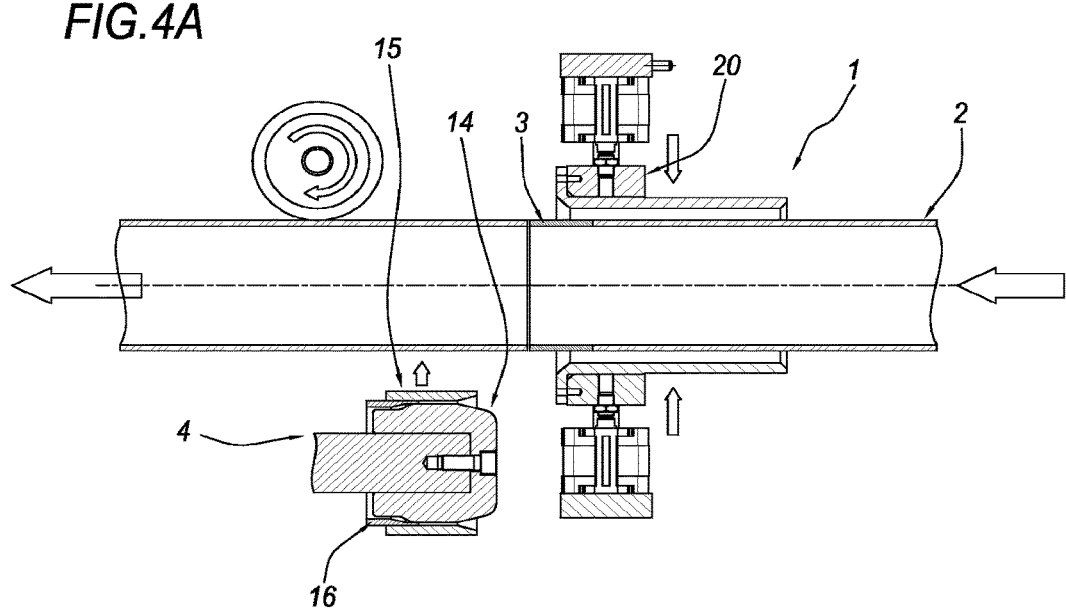
FIGS. 4A-4G schematically illustrate several operational steps of a second embodiment of the apparatus according to this invention.
Figure 4B:
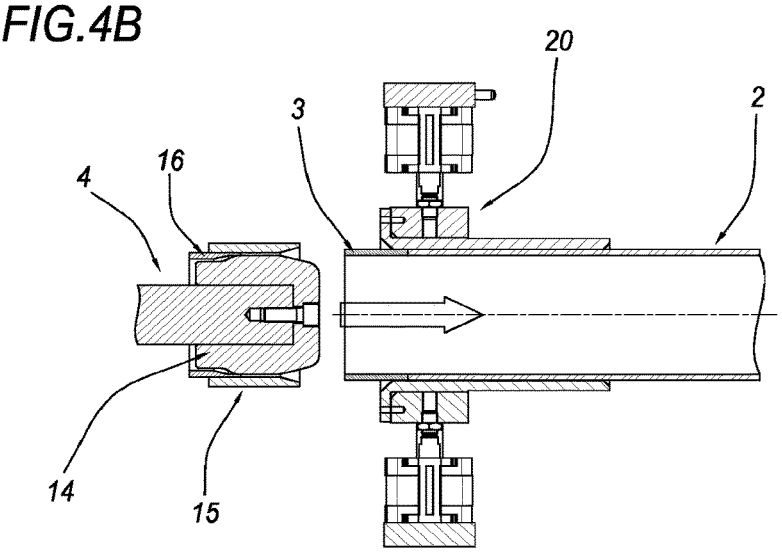
Figure 4C:
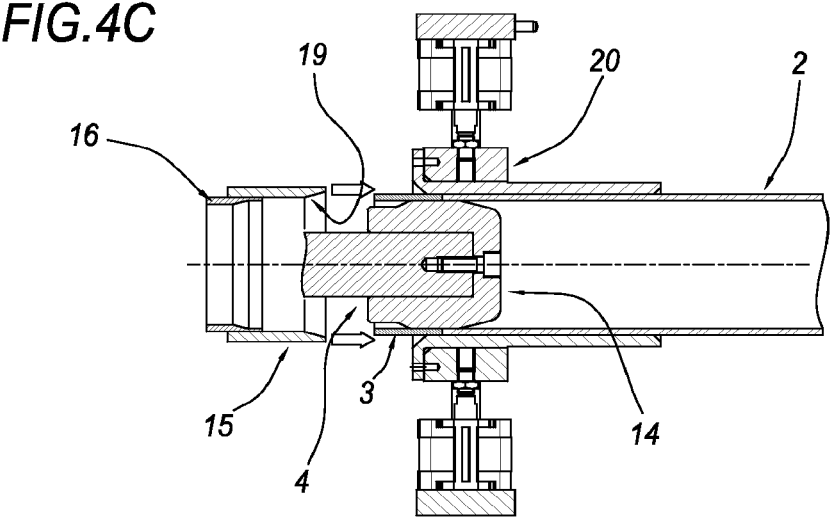

It should be noted that, according to a preferred embodiment, the operation comprises the insertion of the punch 14 inside the pipe 2 (FIGS. 4B-4C).

After inserting the punch 14, the female ring 15 is positioned so as to accommodate internally the end of the pipe 2.

Figure 4D:
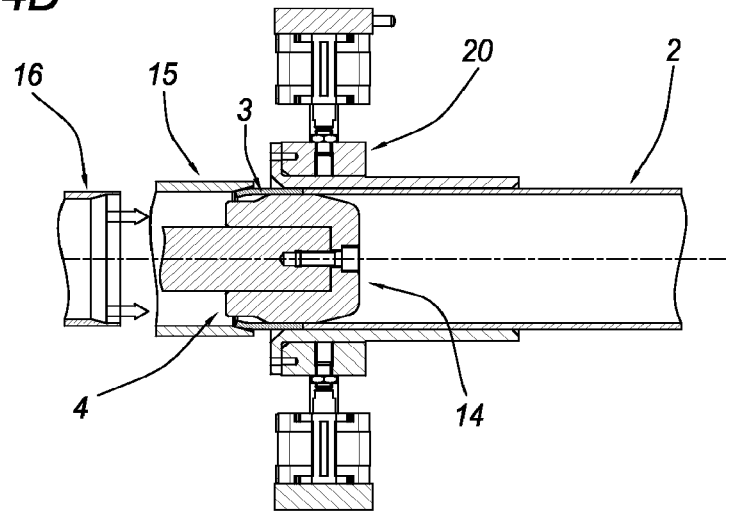
Figure 4E:
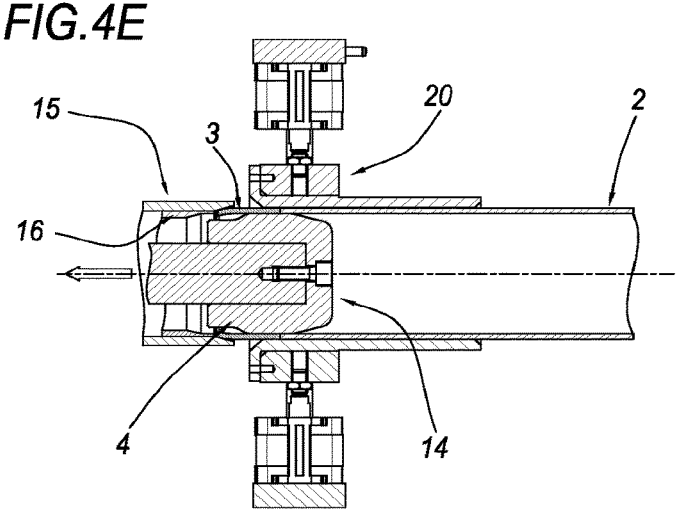
Figure 4F:
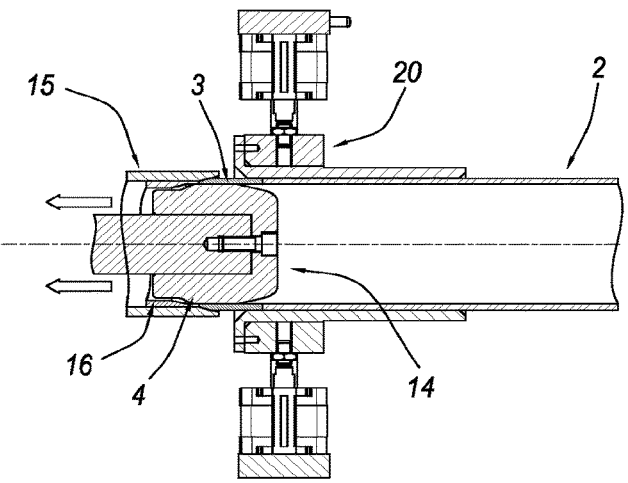
Figure 4G:
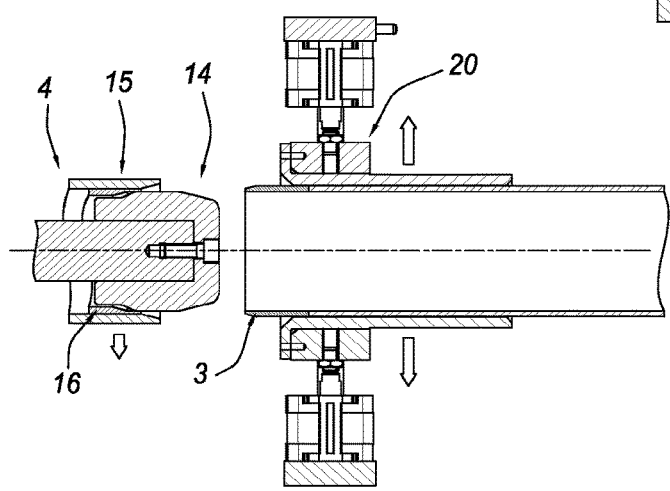

The front flange 16 is moved close to (at a predetermined distance from) the end of the pipe 2 (FIG. 4d).

It should be noted that subsequently (FIG. 4e) the punch 14 is extracted from the pipe 2; during the extraction of the punch 14 from the pipe 2 a portion of the material of the end of the pipe 2 is compressed between the female ring 15 and the punch 14 by the combined action of the ring 15 and the punch 14: in this way a chamfer is formed on the pipe 2.

It should be noted that during the operation for forming the chamfer there is an elongation of the end of the pipe 2, which extends the pipe 2 until making contact with the front flange 16.

For this reason, the front flange 16 allows, in use, the elongation of the pipe 2 to be limited.

It should also be noted that the chamfer is made on the outer surface of the pipe 2.

It should also be noted that the apparatus 1 is provided with a clamp 20, configured for locking the pipe 2 during the operation for chamfering the end.

Figure 6:
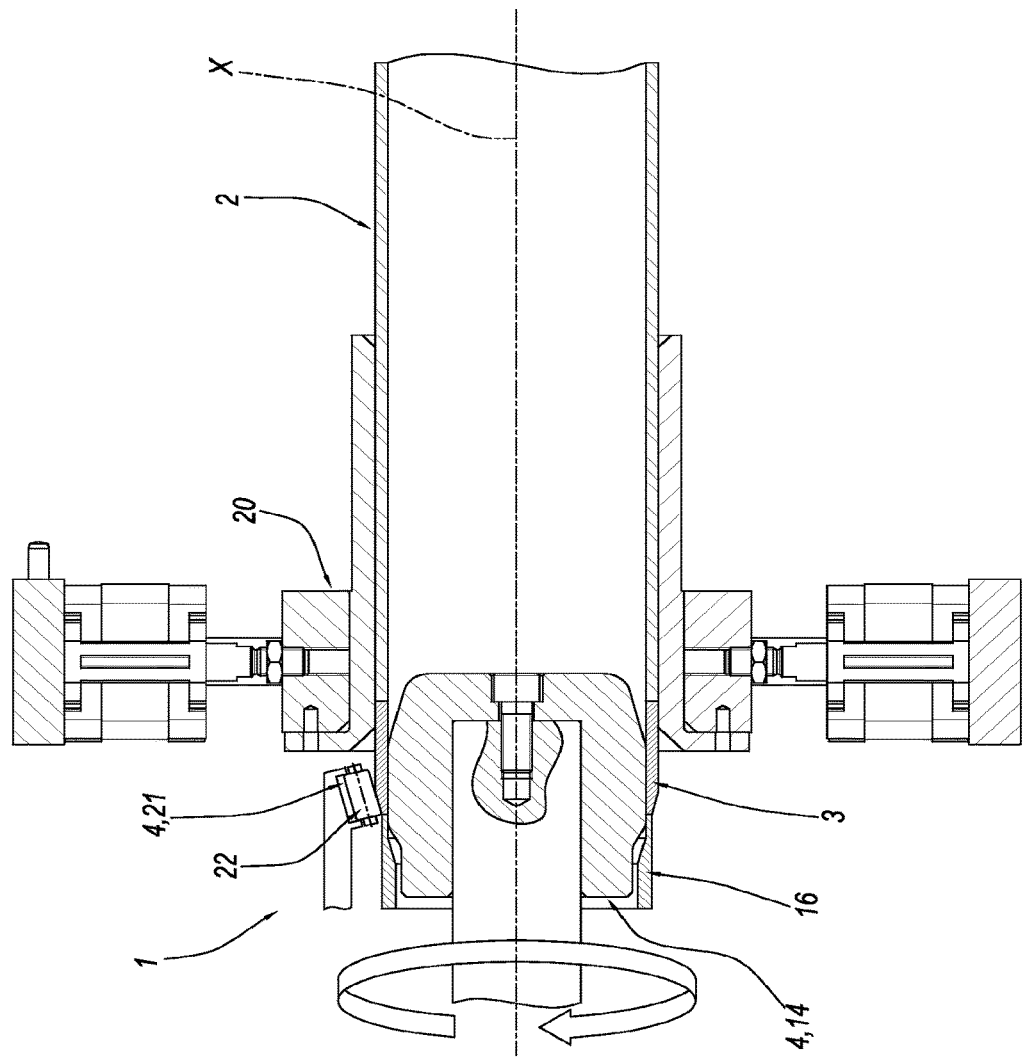
FIG. 6 shows an alternative embodiment of a detail of the apparatus according to this invention.

It should be noted that in the example illustrated the ring 15 is substantially tubular; according to an alternative embodiment illustrated in FIG. 6 the ring 15 is replaced by one or more presser unit 21 configured for acting on a portion of the circumference of the pipe 2.

Preferably, the apparatus 1 comprises three presser units 21, angularly offset.

This alternative embodiment, for chamfering the end of the pipe 2, comprises—after the punch 14 has been inserted and the front flange has been positioned as described above—rotation of the pipe 2 relative to the presser unit 21.

For this reason, the apparatus 1 is configured for allowing the relative rotation of the presser unit 21 (or, more generally, of the presser units 21) relative to the pipe 2.

Preferably, the presser units 21 are rotated relative to the axis X of the pipe 2, in such a way as to form the chamfer on the entire circumference of the end portion 3 of the pipe 2.

It should be noted that, more generally, the presser units 21 or the female ring 15 define, in combination with the punch 14, means of flattening in the direction radial to the end of the pipe 2.

It should also be noted that the presser units 21 or the female ring 15 define, more generally, contact means configured for operating in conjunction with the punch 14, so as to flatten the end of the pipe for making a chamfer.

It should be noted that the chamfering is achieved by plastic deformation of the material which, after heating, is in a "softened" state: for this reason, advantageously, waste and dust is not generated and all the above-mentioned drawbacks of the prior art are overcome.

Therefore, the above-mentioned chamfering is a plastic deformation operation carried out on an end portion of the pipe 3 heated beforehand.

It should be noted that, according to this invention, the plastic deformation step comprises a step for inserting a punch 14 inside the end portion 3 of the pipe and a step for flattening the end portion 3 of the pipe 2 between the punch 14 and a contact element 15, 21 in contact externally with the end portion 3 of the pipe 2.

Described below is a first embodiment of the apparatus 1, with reference to the accompanying drawings 1-3.

It should be noted that the apparatus is equipped with a tool 4 for cutting the pipe 2 in such a way as to carry out operation b1 for cutting the pipe 2; however, it should be noted that, according to this invention, instead of the cutting tool 4 the apparatus 1 may comprise the chamfering tool 4 for carrying out operation b2 for chamfering.

For this reason, the description with reference to the means 5 of heating the portion 3 of the pipe 2 of the apparatus 1 is applicable both to the apparatus 1 with the cutting tool 4 and to the apparatus 1 with the chamfering tool 4.

The apparatus 1 can be mounted in an extrusion line L (an example of this line is illustrated in FIG. 5), for cutting or chamfering the pipe 2.

Alternatively, the apparatus 1 can be mounted outside the line L, for operating on pieces of pipe 2.

The apparatus 1 for processing a pipe 2 made from thermoplastic material comprises, in combination:
heating means 5, designed for heating an axial portion 3 of the pipe 2 at the predetermined temperature;
a tool 4 for processing the heated axial portion 3 of the pipe 2.

The tool 4 and the heating means 5 are preferably fixed to a same supporting carriage 18, configured for being axially movable along the direction of axial extension of the pipe 2.

In that way, the carriage 18 can follow (that is, move at the same speed as) the pipe 2 coming out of the extrusion line, in such a way as to carry out the processing and heating of the pipe moving along the line.

It should be noted that on the carriage 18 it is possible to identify the unit 17 for supporting the heating means, a heating plane R and two processing planes T and S (at which the cutting and chamfering are carried out, respectively).

According to the preferred embodiment, the heating means 5 comprise at least one device 6 for emitting electromagnetic waves.

Preferably, the device 6 is designed for emitting the electromagnetic waves mainly in the 0.8-4 micron range (corresponding to the infrared range).

Figure 3:
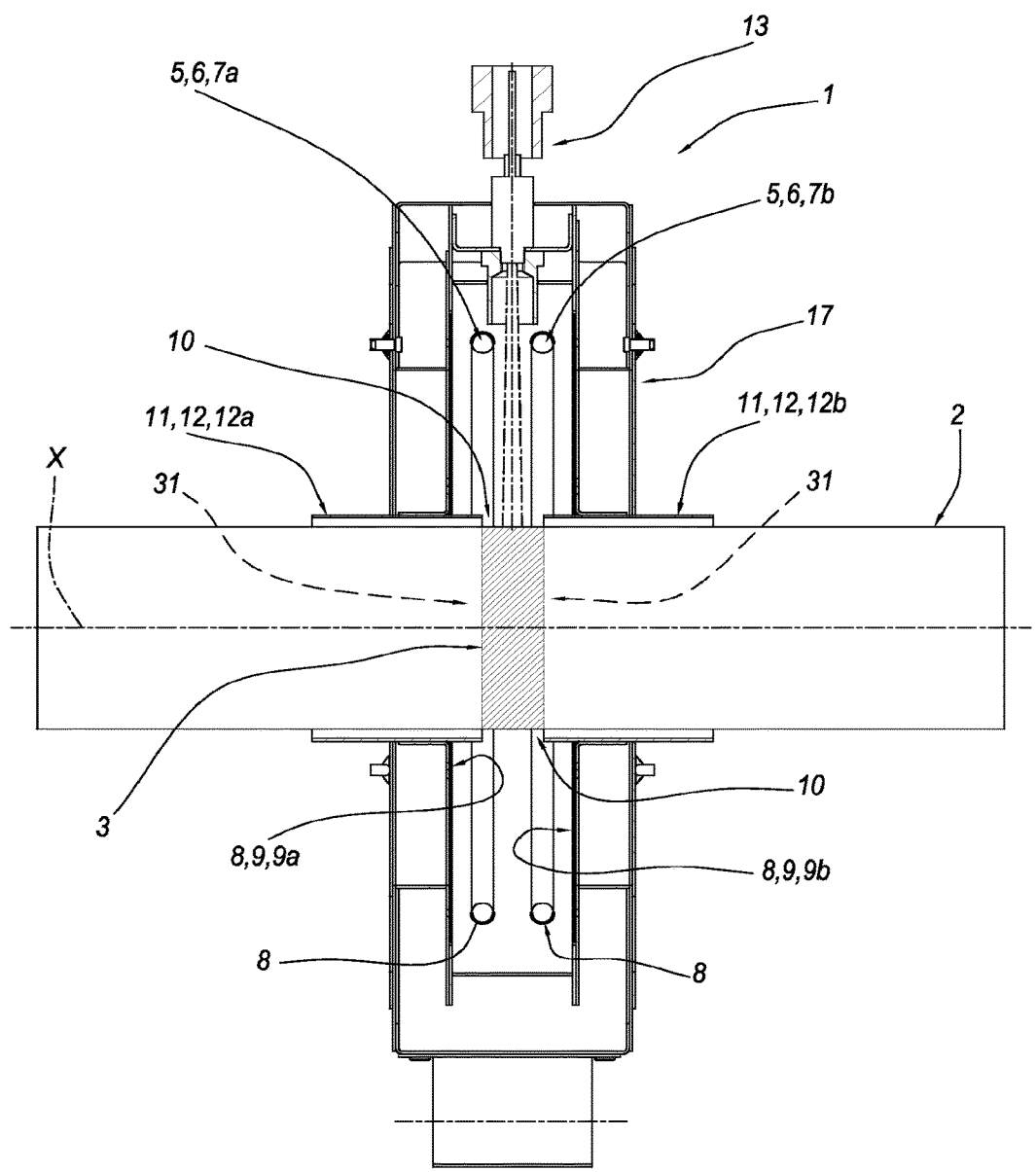
FIG. 3 is a cross-section of the apparatus of FIG. 1.

It should be noted that, as illustrated in FIGS. 1 and 3, the emission device 6 is configured for emitting the electromagnetic waves circumferentially in the direction of the axial portion 3 of pipe 2: in this way, the entire portion 3 of the pipe 2 is heated in a simple way and without movement means (that is, the portion 3 of the pipe is heated over the entire circumference).

The device 6 comprises at least one tungsten filament radiation device 7a, 7b.

In the embodiment illustrated in the drawings, the device 6 comprises a pair of filament radiation devices, which are individually labelled 7a and 7b.

It should be noted that each radiation device 7a and 7b comprises, respectively, a tungsten filament wound in a loop, provided with a first end and a second end.

Preferably, the radiation devices 7a and 7b are positioned angularly offset for compensating any angular emission irregularities of each radiation device (for example, there is a possible irregularity at the sector of the radiation device loop at which the power supply connectors 23 are present).

It should be noted that the apparatus 1 comprises further means 8 for reflecting the electromagnetic waves, designed for reflecting the electromagnetic waves emitted by the device 6 and directing them towards the portion 3 of the pipe 2.

The reflection means 8 therefore comprise one or more surfaces designed for reflecting (by means of one or more consecutive reflections) the electromagnetic waves emitted by the device 6 and directing them towards the portion 3 of the pipe 2.

In this way, advantageously, the majority of the energy emitted by the device 6 is transferred to the portion 3 of the pipe 2 in such a way as to contribute to the heating of the pipe Preferably, the reflection means 8 comprise a ring screen, associated with each filament radiation device (7a, 7b) for directing the waves emitted by the device 6 away from the pipe 2 towards the pipe 2.

It should be noted, therefore, that the ring screen is positioned at each filament 7a, 7b.

Preferably, the ring screen comprises metallic material; even more preferably it comprises a gold-plated coating.

According to the example illustrated, the reflection means 8 comprise a pair of reflectors 9, positioned on opposite sides of and defining an internal opening 31 for receiving the pipe 2.

The reflectors 9 have been individually labelled 9a and 9b.

Preferably, the reflectors 9 comprise mirrors having a substantially smooth regular surface.

Each reflector 9a and 9b has a ring shape.

The opening 31 for receiving the pipe is the inner opening of the ring, through which the pipe is made to pass.

More specifically, it should be noted that in the embodiment illustrated in FIGS. 1 and 3 the reflectors 9a and 9b are positioned at right angles to the axis X of the pipe 2.

According to another aspect, the apparatus 1 comprises means 11 for screening the electromagnetic waves, designed for allowing the transmission of the waves in the direction of the axial portion 3 of the pipe 2 and for preventing the transmission to portions of the pipe 2 different to the axial portion 3.

In other words, the screening means 11 define a region (axial) for transmitting the radiations and a region (axial) for stopping transmission of the radiations: this allows a localised and limited portion of the pipe 2 to be heated, in such a way as to maximise the results obtained in the subsequent operations carried out (cutting, chamfering).

Figure 2:
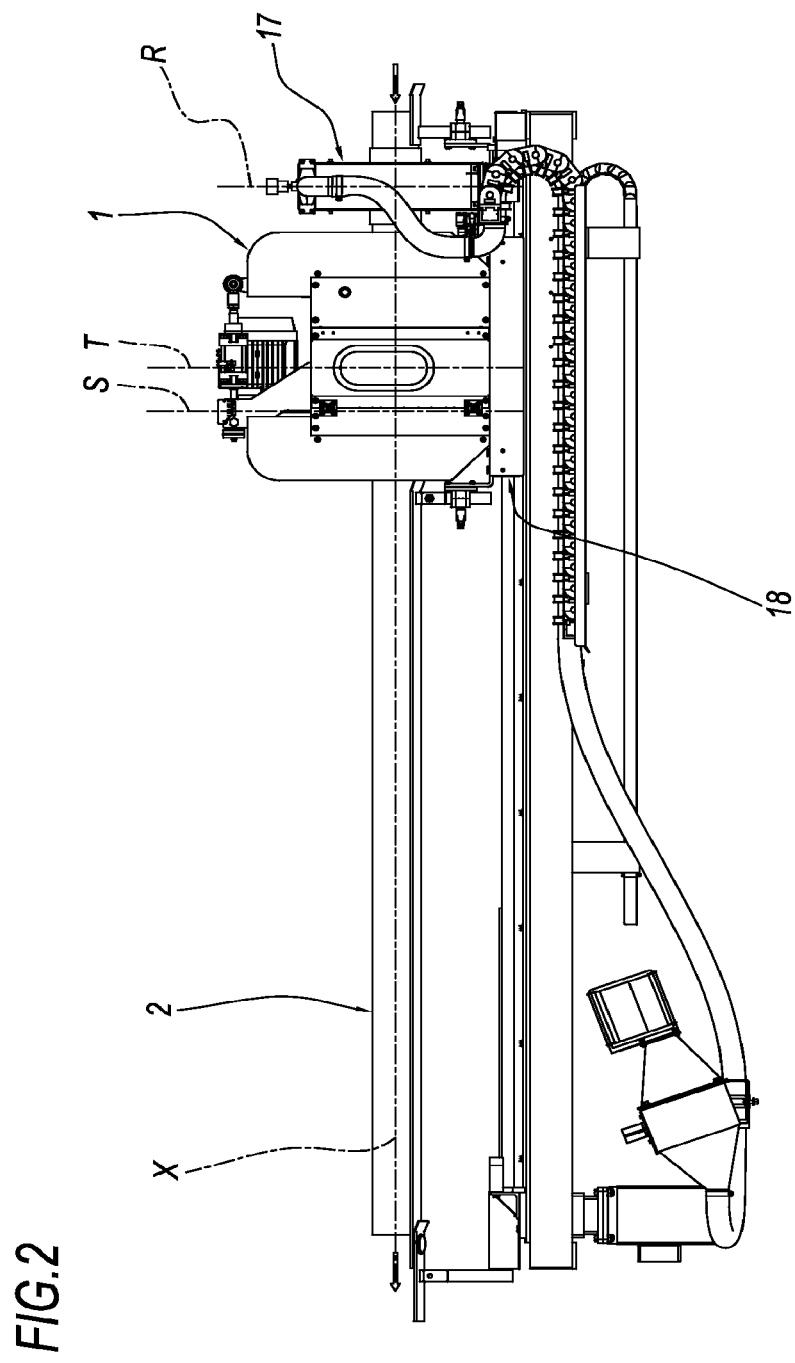
FIG. 2 is a side view of the apparatus of FIG. 1.

In the embodiment illustrated in FIGS. 1-3, the screening means 11 comprise a tubular screen 12 extending axially, designed to be positioned outside the pipe 2.

The tubular screen 12 is provided with a circumferential opening 10 (or heating window 10) for allowing transmission of the electromagnetic waves towards the axial portion 3 of the pipe 2.

It should be noted that the tubular screen 12 preferably comprises two portions 12a and 12b which can be joined together for defining the screen 12.

It should be noted, therefore, that the electromagnetic waves are transmitted to the portion 3 only through the circumferential opening 10; the electromagnetic waves are blocked at the surfaces of the tubular screen 12.

It should be noted that the reflectors 9a and 9b, the tubular screen and the device 6 together define a heating unit 17 configured for transferring a high quantity of energy to a predetermined axial portion 3 of the pipe 2.

It should be noted that the width of the heating window 10 determines the axial extension 3 of the pipe being heating.

According to another aspect, the apparatus 1 also comprises a sensor 13, designed for measuring the temperature of the surface of the pipe 2 at the axial portion 3 of the pipe 2, and means for controlling the heating means 5, designed for controlling the heating means 5 depending on the temperature measured.

Preferably, the sensor 13 is of an optical type; even more preferably it is an optical pyrometer.

It should be noted that, according to this invention, the reflectors 9a, 9b and the portions 12a and 12b of the tubular screen 12 are changed when the size of the pipe being processed is changed.

With reference to the operation of the apparatus 1 during the cutting (operation b1) in an extrusion line L, it should be noted that, when the cross-section of the pipe 2 in which the cut is to be made is close the heating window 10, the carriage 18 is moved and synchronised (that is, it moves at the same speed) with the pipe 2 in such a way that the heating window 10 is kept centred on the desired cutting cross-section.

In this condition, the radiation devices 7a and 7b are activated and kept switched on for the time necessary to carry the portion 3 of the pipe 2 to the predetermined heating temperature.

Preferably, the pipe 2 is kept at the predetermined heating temperature for a predetermined time (which can be a function of the pipe thickness, diameter and material).

Subsequently, the motion of the carriage 18 is reversed and the cutting tool 4 is positioned at the heating portion 3.

At this point, the carriage 18 is synchronised again with the pipe 2 and the means for locking the pipe 2 are activated.

The means for locking the pipe are integral with the carriage 18 and form part of the apparatus 1.

At that moment, the cutting tool 4 cuts the portion 3 of pipe 2 heated beforehand.

After the cutting operation is complete, the tool 4 disengages from the pipe 2, the means for locking the pipe 2 uncouple from the pipe 2 and the apparatus 1 sets up for a new cutting cycle.

This cutting method, the so-called "on the fly" technique, is described in detail in patent document EP 0129515.

It should be noted that, in order to compensate the heating transient of the tungsten filament (which must reach a temperature of approximately 2000° C.), the radiation devices 7a and 7b should be switched on in advance.

It should be noted that, as described above, the apparatus 1 comprises a command and control unit configured for synchronising the motion of the carriage 18 with the advance of the pipe 2.

The invention also defines an installation for processing a pipe 2 made from thermoplastic material, comprising a line L for extruding the pipe 5 (illustrated in FIG. 5) and an apparatus 1, positioned at the line L for performing a cutting and/or chamfering operation on the extruded pipe 2.

Figure 7:
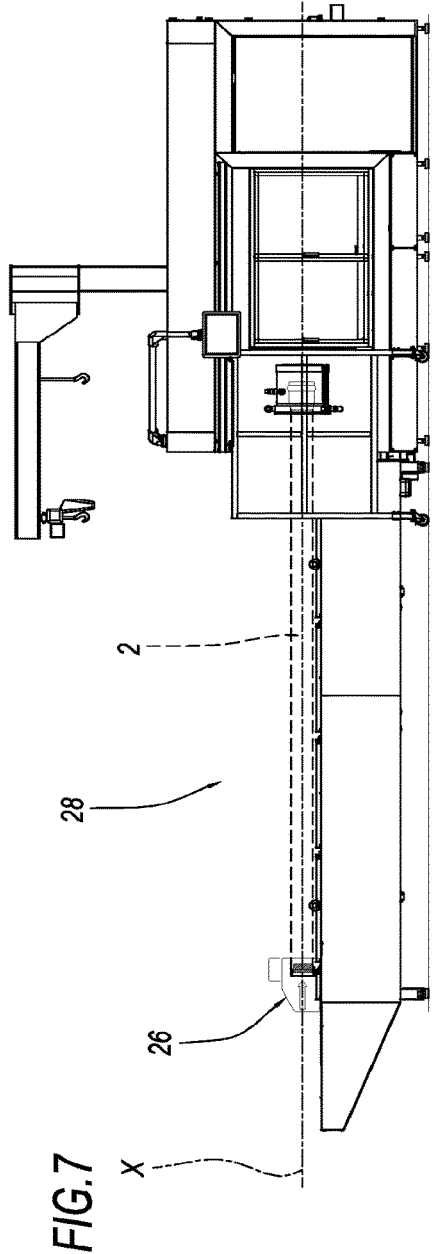
FIGS. 7 and 8 show an embodiment of a processing unit according to this invention.
Figure 8:
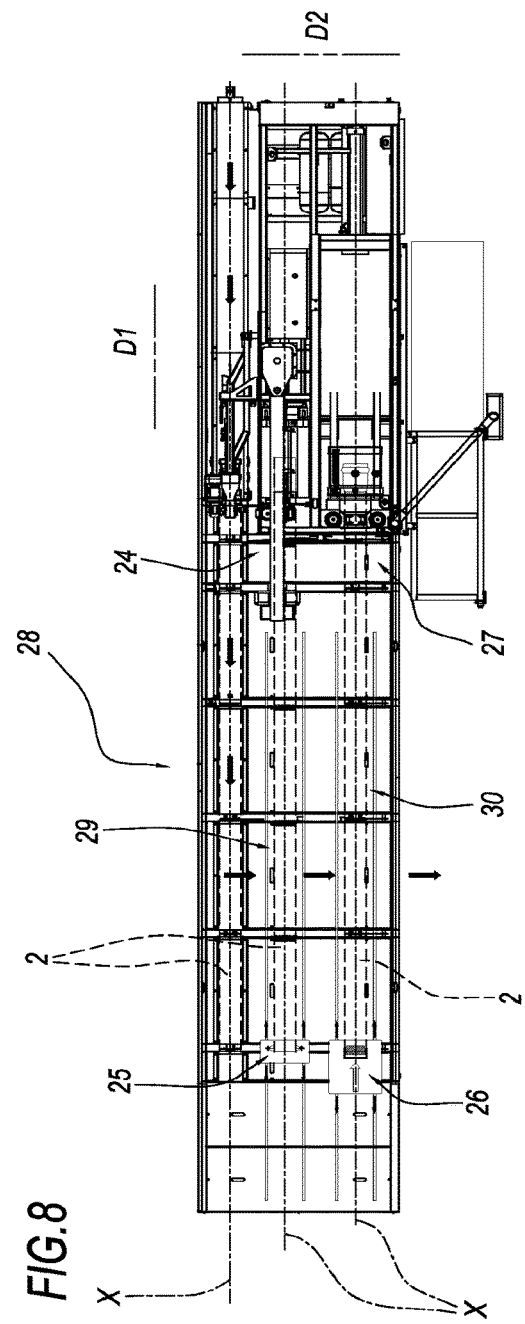

FIGS. 7 and 8 show a processing unit 28 comprising the apparatus according to this invention.

It should be noted that the processing unit 28 enables a combined process of belling (that is, a deformation of the pipe designed to obtain a cup or bell at one end) and chamfering on a piece of pipe 2.

More specifically, the unit 28 enables chamfering on a first end of a piece of pipe 2 and belling at a second end of a piece of pipe 2.

The processing unit 28 can be positioned downstream of the cutting station of an extrusion line, for enabling the chamfering and belling of the pipe outside the extrusion line.

Pieces of pipe 2 are fed to the processing unit 28.

Preferably, the pieces of pipe are fed along a longitudinal direction D1.

The unit 28 comprises a first station 25 for heating an axial portion of a first end of a piece of pipe 2 and a second station 24 (facing the first heating station 25) for heating an axial portion of the second end of the piece of pipe.

It should be noted that the heating stations 24, 25 are preferably positioned relative to each other in such a way as to simultaneously heat the two ends of the piece of pipe 2.

In this way, the two ends of the piece of pipe which undergo different processing (chamfering, belling) are heated simultaneously so as to reduce the total cycle time.

With reference to a piece of pipe being processed in unit 28, chamfering of the first end and belling of the second end will be performed after heating of the piece of pipe in the above-mentioned heating stations 24, 25.

In this regard, the pipe is moved (along the direction D2 at right angles to the direction D1) and located in an area in which a chamfering station 26 and a belling station 27 are present.

The chamfering station 26 and the belling station 27 are positioned substantially facing each other in such a way that each of them acts on a respective end of the pipe.

Preferably, the processes for chamfering and belling the pipe 2 are performed simultaneously, so as to reduce the total cycle time.

The unit 28 comprises a first area 29, wherein the piece of pipe undergoes simultaneously heating of its ends by the two heating stations (24, 25).

Moreover, the unit 28 comprises a second area 30 wherein the ends of the pipe 2 undergo, respectively, chamfering and belling.

It should be noted that the apparatus 1, with the exception of the cutting unit (that is, the apparatus 1 designed for chamfering and not for cutting), is integrated inside the unit 28: the first heating station 25 comprises the heating means 5 of the apparatus 1 and the chamfering station 26 comprises the chamfering tool 4 (these components have already been described above with reference to FIGS. 4a-4g and 6).

It should be noted that the processing method according to this invention is a method without removal of chippings.

It will be understood that the invention described is susceptible of industrial application and may be modified and adapted in several ways without thereby departing from the scope of the inventive concept. Moreover, all the details of the invention may be substituted by technically equivalent elements.

The invention claimed is:

1. An apparatus (1) for chamfering an end of a pipe made from thermoplastic material, characterised in that it comprises, in combination:

heating means (5), configured for circumferentially heating a localised axial end portion (3) of the pipe (2) at a predetermined operating temperature;

at least one tool (4) for processing the heated axial portion (3) of the pipe (2), with the tool (4) configured for flattening the localised axial end portion (3) of the pipe (2) for forming a chamfer on the end of the pipe (2);

wherein the heating means (5) comprise at least one device (6) for emitting electromagnetic waves; the apparatus (1) further comprising screening means (11) for screening the electromagnetic waves, configured for allowing the transmission of the waves in the direction of the axial portion (3) of the pipe (2) and for preventing the transmission to portions of the pipe (2) different to the axial portion (3).

2. The apparatus according to claim 1, wherein the tool (4) comprises:

a punch (14), configured for being inserted inside the pipe (2) at the end;

and a contact element (21, 15) configured for making contact externally with the end of the pipe and operating in conjunction with the punch (14) in such a way as to compress and plastically deform the heated end of the pipe (2), for forming a chamfer on the end of the pipe (2).

3. The apparatus according to claim 2, wherein the contact element (21, 15) is annular.

4. The apparatus according to claim 3, wherein the contact element (21, 15) has a conical inner portion (19) for making contact with the outer surface of the end of the pipe and compressing it radially.

5. The apparatus according to claim 2, wherein the contact element (21, 15) comprises at least one rotary element (22) for compressing the outer surface of the end of the pipe (2).

6. The apparatus according to claim 2, further comprising an element (16) for making axial contact with the end of the pipe, configured for operating in conjunction with the contact element (21, 15) and with the punch (14) so as to make contact axially with the end portion during the radial compression.

7. The apparatus (1) according to claim 1, wherein the device (6) is configured for emitting the electromagnetic waves mainly in the 0.8-4 micron range.

8. The apparatus (1) according to claim 1, wherein the device (6) comprises at least one tungsten filament radiation device (7a, 7b).

9. The apparatus (1) according to claim 1, further comprising:

reflecting means (8) for reflecting electromagnetic waves, configured for reflecting at least a part of the electromagnetic waves emitted by the device (6) in the direction of the annular portion (3) of the pipe (2).

10. The apparatus (1) according to claim 9, wherein the reflection means (8) comprise a pair of reflectors (9a, 9b) with annular extension, positioned in such a way as to face opposite sides of the emission device (6).

11. The apparatus (1) according to claim 1, wherein the screening means (11) comprise a tubular screen (12) extending axially, configured to be positioned outside the pipe (2) and provided with a circumferential opening (10) for allowing the transit of the electromagnetic waves solely to the axial portion (3) of the pipe (2).

12. The apparatus (1) according to claim 1, wherein the apparatus (1) comprises a sensor (13), configured for measuring the temperature of the surface of the pipe (2) at the axial portion (3) of the pipe (2), and means for controlling the heating means (5), configured for controlling the heating means (5) depending on the temperature measured.

13. A unit for processing a pipe made from thermoplastic material having a first and a second end longitudinally opposite each other, comprising:

a first station (25) for heating a localised axial portion of the first end of the pipe (2);

a second station (24) for heating a localised axial portion of the second end of the pipe (2);

a chamfering station (26) configured for making a chamfer on the heated axial portion of the first end of the pipe (2);

a belling station (27) configured for performing a belling process on the heated axial portion of the second end of the pipe (2);

the first station (25) and second station (24) for heating being positioned so as to heat the ends of the pipe substantially simultaneously, wherein the unit comprises an apparatus according to claim 1, the first heating station (25) comprising the means (5) for heating the apparatus (1) and the chamfering station (26) comprising the tool (4) of the apparatus (1).

* * * * *